(12) United States Patent
Ariga et al.

(10) Patent No.: US 8,366,575 B2
(45) Date of Patent: Feb. 5, 2013

(54) VEHICLE POWER TRANSMISSION DEVICE

(75) Inventors: Michihiro Ariga, Anjo (JP); Yasuhiro Oku, Anjo (JP); Syoichi Sayo, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 277 days.

(21) Appl. No.: 12/585,887

(22) Filed: Sep. 28, 2009

(65) Prior Publication Data

US 2010/0083792 A1  Apr. 8, 2010

(30) Foreign Application Priority Data

Oct. 7, 2008  (JP) ................................. 2008-261047

(51) Int. Cl.
  *F16H 57/04* (2010.01)
  *F16H 55/56* (2006.01)
  *F16H 7/00* (2006.01)
  *F01M 11/02* (2006.01)

(52) U.S. Cl. .................. 474/91; 474/8; 474/43; 474/73; 74/467; 74/606 R; 123/196 R; 476/8

(58) Field of Classification Search .................... 474/73, 474/8–28, 43–45, 91; 74/467, 606 R; 475/160; 123/196 R; 476/8
See application file for complete search history.

(56) References Cited

U.S. PATENT DOCUMENTS

| | | | | |
|---|---|---|---|---|
| 2,645,305 A | * | 7/1953 | Roos | 184/11.1 |
| 4,784,018 A | * | 11/1988 | Okada et al. | 475/146 |
| 4,841,797 A | * | 6/1989 | Cerrington et al. | 74/467 |
| 4,950,213 A | * | 8/1990 | Morisawa | 475/206 |
| 5,158,152 A | * | 10/1992 | Nemoto et al. | 184/6.12 |
| 6,189,412 B1 | * | 2/2001 | Tsubata et al. | 74/606 R |
| 7,984,791 B2 | * | 7/2011 | Taguchi et al. | 184/6.12 |
| 2006/0070839 A1 | * | 4/2006 | Sugano et al. | 192/219.5 |
| 2008/0135337 A1 | * | 6/2008 | Kawamoto | 184/6.12 |
| 2009/0165587 A1 | * | 7/2009 | Ariga et al. | 74/467 |

FOREIGN PATENT DOCUMENTS

| | | |
|---|---|---|
| JP | A-9-216525 | 8/1997 |
| JP | A-2004-36633 | 2/2004 |
| JP | A-2004-183714 | 7/2004 |
| JP | A-2004-324663 | 11/2004 |
| JP | A-2005-201316 | 7/2005 |

OTHER PUBLICATIONS

Partial Translation of Sep. 7, 2010 Office Action issued in Japanese Patent Application No. 2008-261047.
Partial Translation of foreign Office Action dispatched Jan. 18, 2011 in Japanese Application No. 2008-261047.

* cited by examiner

*Primary Examiner* — Michael Mansen
*Assistant Examiner* — Minh Truong
(74) *Attorney, Agent, or Firm* — Oliff & Berridge, PLC

(57) ABSTRACT

A power transmission device that includes an uppermost side bearing; a lower side bearing; an uppermost side lubricating medium storage portion defined between the uppermost side bearing and the case to guide a lubricating medium to the uppermost side bearing; a lower side lubricating medium storage portion defined between the lower side bearing and the case to guide a lubricating medium to the lower side bearing, and located below the uppermost side lubricating medium storage portion when installing the power transmission device for a vehicle on the vehicle; and a communicating passage formed in the case to communicate the uppermost side lubricating medium storage portion and the lower side lubricating medium storage portion with each other.

5 Claims, 4 Drawing Sheets

VEHICLE POWER TRANSMISSION DEVICE

INCORPORATION BY REFERENCE

The disclosure of Japanese Patent Application No. 2008-261047 filed on Oct. 7, 2008 including the specification, drawings and abstract is incorporated herein by reference in its entirety.

BACKGROUND

The present invention relates to a power transmission device for a vehicle that includes a transmission mechanism accommodated in a case and capable of transmitting power between a plurality of rotating elements, and that transmits power from a power generation source to an axle through the transmission mechanism with the power transmission device installed on the vehicle.

As an example of a power transmission device for a vehicle of this type, a power transmission device for a vehicle including a torque converter, an oil pump, a forward/backward switching mechanism, a continuously variable transmission unit, a gear train, a differential mechanism (differential gear), and the like accommodated in a case composed of a converter housing, a transaxle case, and a rear cover has been known (for example, see Japanese Patent Application Publication No. 2004-183714 and Japanese Patent Application Publication No. 2004-36633). In such a power transmission device for a vehicle, power from an engine is: transmitted to the continuously variable transmission unit through the torque converter and the forward/backward switching unit; continuously shifted by the continuously variable transmission unit; and transmitted to right and left drive wheels through the gear train and the differential mechanism.

SUMMARY

In the power transmission device for a vehicle describe above, bearings supporting rotating shafts such as a primary shaft and a secondary shaft of the continuously variable transmission unit are supplied with a lubricating medium forcibly fed by the oil pump through a predetermined oil passage. The differential mechanism, and the like arranged at a lower part of the case is mainly lubricated by a lubricating medium stored at a bottom part of the case. A shaft of a gear at an intermediate stage of the gear train that transmits power from the secondary shaft of the continuously variable transmission unit to the differential mechanism, and a bearing supporting the shaft of such a gear at the intermediate stage are basically lubricated by a lubricating medium that is pushed up by other gears in accordance with the rotation of the drive wheels or that is carried along other gears. Thus, under a condition in which an ambient temperature is extremely low, for example, a sufficient amount of lubricating medium is not supplied to the shaft of the gear at the intermediate stage, the bearing supporting the shaft, and the like that are not forcibly supplied with a lubricating medium. If the rotational speed of the gear at the intermediate stage is increased in such a state, the temperature of the shaft of the gear at the intermediate stage and the bearing that supports the shaft may become excessively high.

In view of the above, an object of the present invention is to provide a power transmission device for a vehicle capable of favorably lubricating a lubrication object that is not forcibly supplied with a lubricating medium.

Power transmission devices for vehicles of the present invention adopt the features described below in order to achieve the object.

A power transmission device for a vehicle according to an aspect of the present invention that includes a transmission mechanism accommodated in a case and transmitting power between a plurality of rotating elements, and that transmits power from a power generation source to an axle through the transmission mechanism with the power transmission device installed on the vehicle, the power transmission device includes: an uppermost side bearing that is fixed to the case and rotatably supports a shaft of an uppermost side rotating element positioned on the uppermost side of the case among the rotating elements included in the transmission mechanism when installing the power transmission device on the vehicle; a lower side bearing that is fixed to the case and rotatably supports a shaft of a lower side rotating element positioned on a lower side of the uppermost side rotating element among the rotating elements included in the transmission mechanism when installing the power transmission device on the vehicle; an uppermost side lubricating medium storage portion defined between the uppermost side bearing and the case to guide a lubricating medium to the uppermost side bearing; a lower side lubricating medium storage portion defined between the lower side bearing and the case to guide a lubricating medium to the lower side bearing, and located below the uppermost side lubricating medium storage portion when installing the power transmission device for a vehicle on the vehicle; and a communicating passage formed in the case to communicate the uppermost side lubricating medium storage portion and the lower side lubricating medium storage portion with each other.

In the power transmission device for a vehicle, the shaft of the uppermost side rotating element positioned on the uppermost side of the case among the rotating elements included in the transmission mechanism when installing the power transmission device on the vehicle is rotatably supported by the uppermost side bearing fixed to the case, and the shaft of the lower side rotating element positioned on the lower side of the uppermost side rotating element among the rotating elements included in the transmission mechanism when installing the power transmission device on the vehicle is rotatably supported by the lower side bearing fixed to the case. Also, the uppermost side lubricating medium storage portion is defined between the uppermost side bearing and the case to guide a lubricating medium to the uppermost side bearing, and the lower side lubricating medium storage portion is defined between the lower side bearing and the case so that the lower side lubricating medium storage portion is located below the uppermost side lubricating medium storage portion when installing the power transmission device on the vehicle, and guides the lubricating medium to the lower side bearing. The uppermost side lubricating medium storage portion and the lower side lubricating medium storage portion are communicated with each other through the communicating passage formed in the case. With this arrangement, when a lubricating medium is supplied to the uppermost side lubricating medium storage portion, the lubricating medium is guided from the uppermost side lubricating medium storage portion to the uppermost side bearing, flows down to the lower side lubricating medium storage portion through the communicating passage, and is guided from the lower side lubricating medium storage portion to the lower side bearing. Consequently, in the power transmission device for a vehicle, if a lubricating medium is supplied to the uppermost side lubricating medium storage portion, the lower side bearing as a lubrication object can be favorably lubricated even if the lubricated medium is not forcibly supplied to the lower side bearing.

The power transmission device for a vehicle may also include, a lubricating medium supplying unit that forcibly supplies a lubricating medium to the uppermost side lubricating medium storage portion. With this arrangement, the lubricating medium can be stably supplied to the uppermost side lubricating medium storage portion, and also the lower side bearing can be favorably lubricated.

Further, the communicating passage may extend along a line coupling the shaft of the uppermost side rotating element and the shaft of the lower side rotating element. With this arrangement, an opening portion in the communicating passage with respect to the uppermost side lubricating medium storage portion and an opening portion in the communicating passage with respect to the lower side lubricating medium storage portion can be formed not to generate stress concentration. Thus, durability of the case can be enhanced.

Also, the uppermost side lubricating medium storage portion may be defined by the uppermost side bearing and a side wall portion of the case. The lower side lubricating medium storage portion may be defined by the lower side bearing and the side wall portion of the case. The communicating passage may be a recessed portion formed in the side wall portion of the case in a manner that the depth of the communicating passage gradually decreases from the uppermost side lubricating medium storage portion toward a center portion of the communicating passage, and gradually increases from the center portion toward the lower side lubricating medium storage portion. With this arrangement, even if the communicating passage having a recessed shape is formed in the side wall portion of the case, rigidity of the side wall portion of the case can be secured without preventing the flow of the lubricating medium from the uppermost side lubricating medium storage portion to the lower side lubricating medium storage portion.

Further, the transmission mechanism may be a gear train including at least three gears. The uppermost side rotating element may be an uppermost side gear positioned on the uppermost side of the case among the gears included in the gear train when installing the power transmission device on the vehicle. The lower side rotating element may be an intermediate gear positioned between the uppermost side gear and a lowermost side gear positioned on the lowermost side of the case among the gears included in the gear train when installing the power transmission device on the vehicle.

Also, the lowermost side gear may be a gear that pushes up a lubricating medium at an inner bottom portion of the case toward the center of an inner part of the case without making the lubricating medium flow along an inner wall surface of the case when the axle rotates normally, and the uppermost side gear may be a gear that rotates in the same direction as the lowermost side gear when the axle rotates normally. That is, the power transmission device for a vehicle includes the lowermost side gear that is positioned at the lowermost side of the case among the gears included in the gear train when the power transmission device is installed on the vehicle, and that pushes up the lubricating medium at the inner bottom portion of the case toward the center of the inner part of the case without making the lubricating medium flow along the inner wall surface of the case when the axle rotates normally. The power transmission device has a mirror-inverted arrangement of the related-art power transmission device for a vehicle. With this arrangement, in a vehicle installed with the power transmission device for a vehicle, a wheelbase can be extended easily. Also, with the structure in which the lowermost side gear pushes up the lubricating medium at the inner bottom portion of the case toward the center of the inner part of the case without making the lubricating medium flow along the inner wall surface of the case when the axle rotates normally, and the uppermost side gear rotates in the same direction as the lowermost side gear when the axle rotates normally, a sufficient amount of lubricating medium may not be carried from the lowermost side gear to the intermediate gear. However, as described above, by communicating the uppermost side lubricating medium storage portion and the lowermost side lubricating medium storage portion with each other through the communicating passage, a sufficient amount of lubricating medium can be carried to the intermediate gear. Consequently, in the vehicle installed with the power transmission device for a vehicle, the wheelbase can be easily extended, and the lubrication object that is not forcibly supplied with the lubricating medium can be favorably lubricated.

The power transmission device for a vehicle according to an aspect of the present invention may further include a continuously variable transmission unit accommodated in the case and continuously shifting power from the power generation source and transmitting the power to the gear train. The vehicle may be a front-wheel-drive vehicle. The lowermost side gear may be a differential ring gear coupled to a differential mechanism. A primary shaft of the continuously variable transmission unit may be positioned closer to the rear of the vehicle than the lowermost side gear when installing the power transmission device on the vehicle. With this arrangement, in the front-wheel-drive vehicle installed with the power transmission device for a vehicle, the wheelbase can be easily extended, and the lubrication object that is not forcibly supplied with the lubricating medium can be favorably lubricated.

DETAILED DESCRIPTION OF EMBODIMENTS

Next, an embodiment for implementing the present invention will be explained.

Figure 1:
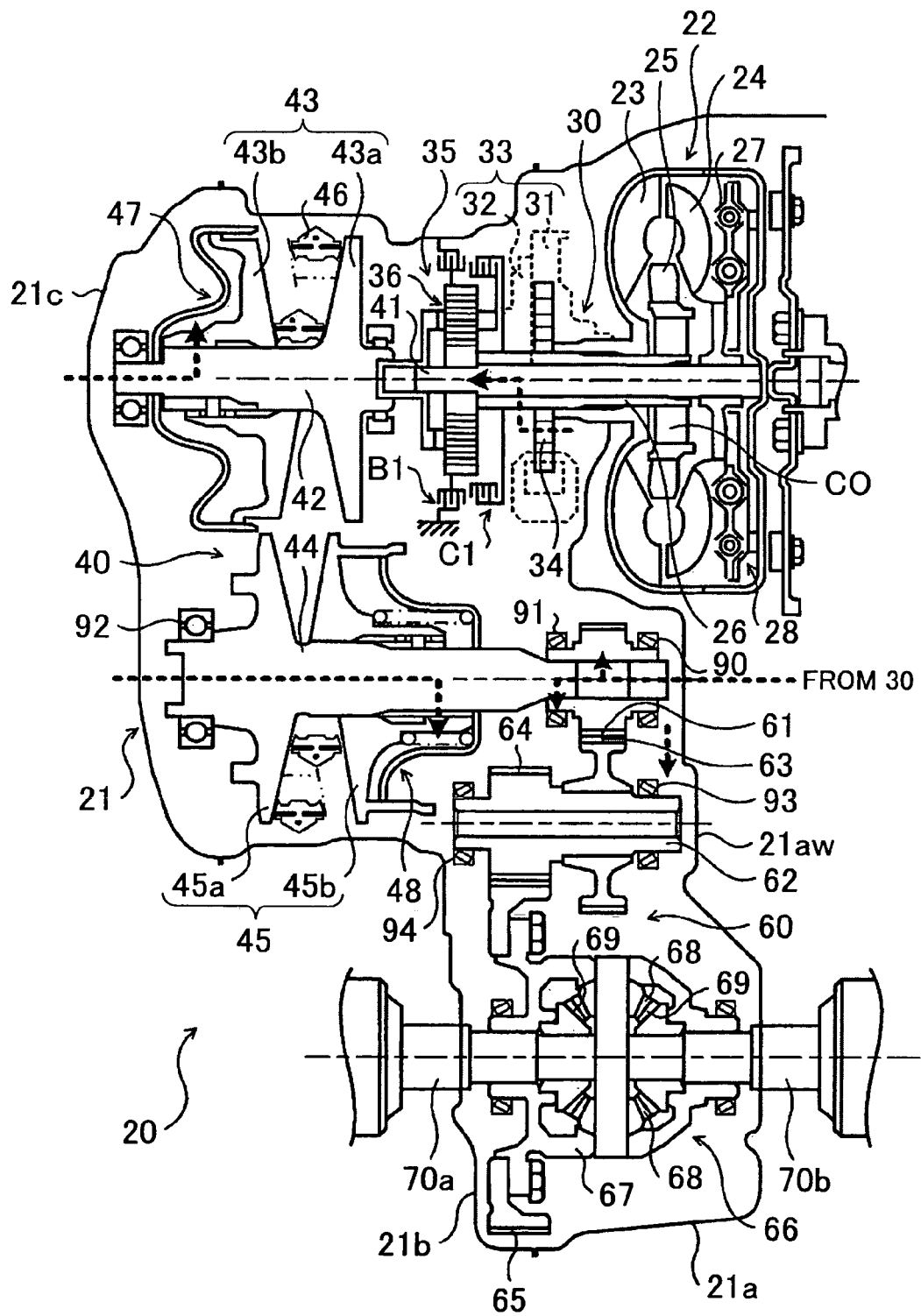
FIG. 1 is a schematic configuration view of a power transmission device 20 according to an embodiment of the present invention.

FIG. 1 is a schematic configuration view showing a power transmission device (transmission) according to the embodiment of the present invention. The power transmission device 20 shown in FIG. 1 is applied to a front-wheel-drive vehicle, and transmits power from an engine not shown installed on a front part of the vehicle to right and left front wheels. The device 20 includes: a case 21 composed by integrally connecting a converter housing 21a, a transaxle case 21b, and a rear cover 21c; and a torque converter 22, an oil pump 30, a forward/backward switching unit 35, a belt-type continuously variable transmission unit (hereinafter referred to as "CVT") 40, a gear mechanism (gear train as a transmission mechanism) 60, a differential mechanism (differential gear) 66, and the like accommodated in an inner part of the case 21.

More specifically, in a vehicle installed with the power transmission device 20, power from the engine is: transmitted to the CVT 40 through the torque converter 22 and the forward/backward switching unit 35; continuously shifted by the CVT 40; and transmitted to the right and left front wheels through the gear mechanism 60 and the differential mechanism 66.

The torque converter 22 is structured as a fluid-type torque converter with a lock-up clutch, and is accommodated in an inner part of the converter housing 21a. As shown in FIG. 1, the torque converter 22 includes a pump impeller 23 connected to a crankshaft of the engine not shown, a turbine runner 24 fixed to an input shaft 41 of the CVT 40, a stator 25 arranged on an inner side of the pump impeller 23 and the turbine runner 24, a one-way clutch CO that restricts the rotational direction of the stator 25 in one direction, a lock-up clutch 28 including a damper mechanism 27, and the like. The torque converter 22 functions as a torque amplifier when a rotational speed difference between the pump impeller 23 and the turbine runner 24 is large, and functions as a fluid coupling when the rotational speed difference between the pump impeller 23 and the turbine runner 24 becomes small. When vehicle speed reaches a predetermined speed after the vehicle starts moving, the pump impeller 23 and the turbine runner 24 are locked by the lock-up clutch 28, and power from the engine is mechanically and directly transmitted to the input shaft 41. In this case, fluctuation of torque transmitted to the input shaft 41 is absorbed by the damper mechanism 27.

The oil pump 30 is structured as a so-called gear pump arranged between the torque converter 22 and the forward/backward switching unit 35. The oil pump 30 includes a pump assembly 33 composed of a pump body 31 and a pump cover 32, and an externally-toothed gear 34. The pump body 31 and the pump cover 32 are fixed to the converter housing 21a and the transaxle case 21b. The externally-toothed gear 34 is connected to the pump impeller 23 through a hub, and forms a crescent together with an internal tooth not shown formed in the pump body 31. With this configuration, when the externally-toothed gear 34 rotates by power from the engine, working fluid (ATF) stored in an oil pan 80 (see FIG. 2) is sucked by the oil pump 30 and pressure of the sucked working fluid is increased. Thus, hydraulic pressure (line pressure) required from the CVT 40 and the forward/backward switching unit 35 can be generated, and the working fluid as a lubricating medium can be supplied to lubrication objects such as predetermined portions of the CVT 40, the one-way clutch CO, the forward/backward switching unit 35, and the like, and to various bearings.

The forward/backward switching unit 35 is accommodated in an inner part of the transaxle case 21b and includes: a double-pinion type planetary gear mechanism 36; and a hydraulic brake B1 and a clutch C1 that are powered by the working fluid from the oil pump 30. The planetary gear mechanism 36 includes: a sun gear fixed to the input shaft 41 of the CVT 40; a ring gear; and a carrier that supports a pinion gear that meshes with the sun gear and a pinion gear that meshes with the ring gear, and that is coupled to a primary shaft 42 of the CVT 40. The brake B1 makes the ring gear of the planetary gear mechanism 36 fix to the transaxle case 21b, and also makes the ring gear rotatable. The clutch C1 makes the carrier of the planetary gear mechanism 36 fix to the input shaft 41 (sun gear), and also makes the carrier rotatable. Thus, by disengaging the brake B1 and engaging the clutch C1, power transmitted from the torque converter 22 to the input shaft 41 is transmitted to the primary shaft 42 of the CVT 40 as is, and the vehicle is moved forward as a consequence. Also, by engaging the brake B1 and disengaging the clutch C1, rotation of the input shaft 41 is reversed and transmitted to the primary shaft 42 of the CVT 40, and the vehicle is moved backward as a consequence. Further, by disengaging the clutch C1 and engaging the brake B1, connection of the input shaft 41 and the primary shaft 42 can be released.

The CVT 40 is accommodated in inner parts of the transaxle case 21b and the rear cover 21c and includes: the primary shaft 42 as a drive side rotating shaft extending coaxially with the input shaft 41; a primary pulley 43 provided with respect to the primary shaft 42; a secondary shaft (output shaft) 44 as a driven side rotating shaft extending parallel to the primary shaft 42; a secondary pulley 45 provided with respect to the secondary shaft 44; and a belt 46 wound around the primary pulley 43 and the secondary pulley 45. The primary pulley 43 is composed of a fixed sheave 43a integrally formed with the primary shaft 42; and a movable sheave 43b supported slidably in the axial direction by the primary shaft 42 through a roller spline and the like. Behind (on the left side in FIG. 1 of) the movable sheave 43b of the primary pulley 43, a hydraulic cylinder (hydraulic actuator) 47 for changing the width of the groove of the primary pulley 43 is formed. The secondary pulley 45 is composed of: a fixed sheave 45a integrally formed with the secondary shaft 44; and a movable sheave 45b supported slidably in the axial direction by the secondary shaft 44 through a roller spline, a return spring, and the like. Behind (on the right side in FIG. 1 of) the movable sheave 45b of the secondary pulley 45, a hydraulic cylinder (hydraulic actuator) 48 for changing the width of the groove of the secondary pulley 45 is formed. The working fluid increased in pressure by the oil pump 30 is pressure adjusted by a hydraulic circuit (valve body) not shown including a plurality of control valves, and then, supplied to the hydraulic cylinder 47 on the primary pulley 43 side and the hydraulic cylinder 48 on the secondary pulley 45 side. This makes it possible to change the widths of the grooves of the primary pulley 43 and the secondary pulley 45, and power input from the input shaft 41 to the primary shaft 42 is continuously shifted and output to the secondary shaft 44. As shown in FIG. 1, one end (right end in FIG. 1) of the secondary shaft 44 is rotatably supported by a bearing (roller bearing) 90 fixed to the converter housing 21a and a bearing (roller bearing) 91 fixed to the transaxle case 21b. The other end of the secondary shaft 44 is rotatably supported by a bearing (ball bearing) 92 fixed to the rear cover 21c.

Figure 2:
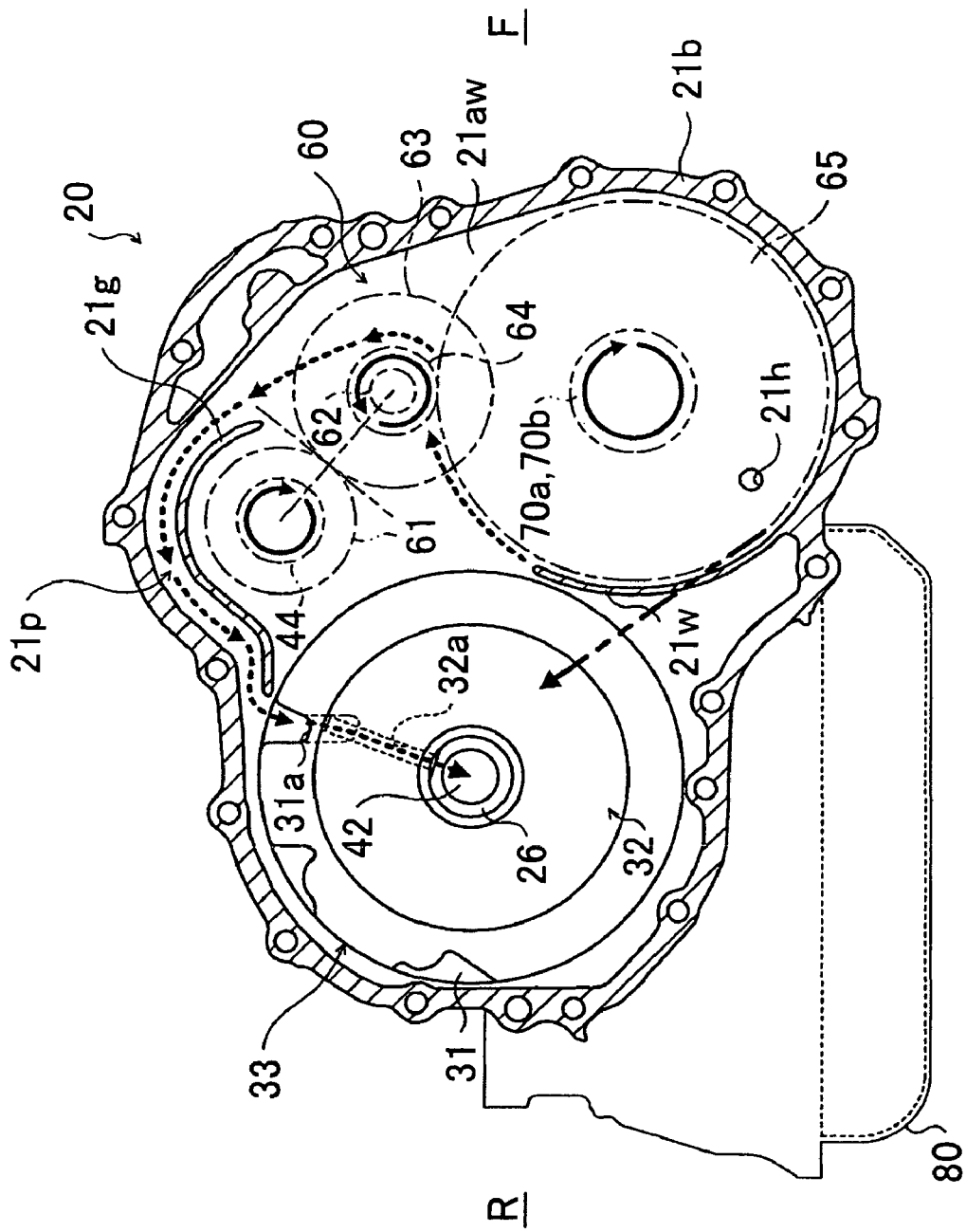
FIG. 2 is a partial cross-sectional view of an inner part of a transaxle case 21b of the power transmission device 20 of the embodiment.

The gear mechanism 60 is accommodated in the inner parts of the converter housing 21a and the transaxle case 21b and includes: a counter drive gear 61 fixed to one end of the secondary shaft 44; a counter driven gear 63 that is fixed on one end side of the counter shaft 62 extending parallel to the secondary shaft 44 and that meshes with the counter drive gear 61; a drive pinion gear (final drive gear) 64 fixed on the other end side of the counter shaft 62; and a differential ring gear (final driven gear) 65 that meshes with the drive pinion gear 64 and is connected to the differential mechanism 66. When installing the power transmission device 20 on the vehicle, as shown in FIG. 2, the differential ring gear 65 is located on the lowermost side of the case 21 among gears included in the gear mechanism 60, and the counter drive gear 61 is located on the uppermost side of the case 21 among the gears included in the gear mechanism 60. Also, as shown in FIG. 1, the differential mechanism 66 is rotatably supported in the case 21 and includes: a differential case 67 coupled to the differential ring gear 65; a pair of pinion mate gears (bevel gears) 68 fixed to a shaft rotatably supported by the differential case 67; and a pair of side gears 69 respectively meshing with the pinion mate gears 68. The side gears 69 are respectively fixed with left and right differential shafts 70a and 70b as a front wheel axle. As shown in FIG. 1, one end (right end in FIG. 1) of the counter shaft 62 is rotatably supported by a bearing (roller bearing) 93 fixed to the converter housing 21a. The other end (left end in FIG. 1) of the counter shaft 62 is rotatably supported by a bearing (roller bearing) 94 fixed to the transaxle case 21b.

The power transmission device 20 of the embodiment has a mirror-inverted arrangement of a general power transmission device for a front-wheel-drive vehicle. More specifically, while a general power transmission device for a front-wheel drive vehicle is structured to be installed on a vehicle so that a differential ring gear (differential mechanism) is positioned closer to the rear of the vehicle than a primary shaft of a CVT, the power transmission device 20 of the embodiment is structured to be installed on a vehicle so that the differential ring gear 65 (differential mechanism 66) is positioned closer to the front of the vehicle than the primary shaft 42 of the CVT 40 as shown in FIG. 2. Thus, a wheelbase, which is a distance between front and back vehicle axles, can be easily extended in the vehicle installed with the power transmission device 20. Thus, indoor space, luggage compartment space, and the like can be enlarged. Note that, the right side of FIG. 2 is the front side (F) of the vehicle, and the left side of FIG. 2 is the rear side (R) of the vehicle.

For example, when a vehicle installed with the power transmission device 20 is towed, with its four wheels grounded, by another vehicle in the case of breakdown and the like, the oil pump 30 cannot be activated because the engine is stopped. Thus, the working fluid as a lubricating medium cannot be supplied to a lubrication object through the oil pump 30. Further, when the vehicle is towed, since pressure of the working fluid cannot be increased up to line pressure by the oil pump 30, both of the brake B1 and the clutch C1 of the forward/backward switching unit 35 become released. Thus, due to, for example, the action of the return spring on the secondary pulley 45 side, the width of the groove of the primary pulley 43 becomes the maximum (effective radius of the primary pulley 43 becomes the minimum), and the width of the groove of the secondary pulley 45 becomes the minimum (effective radius of the secondary pulley 45 becomes the maximum), and the CVT 40 becomes in a maximum underdrive condition. Thus, when the vehicle is towed, the primary shaft 42 of the CVT 40 will be in an overdrive condition with respect to the differential shafts 70a and 70b as the axle, and the primary shaft 42 rotates relatively fast. Consequently, the necessity of favorably lubricating the forward/backward switching unit 35 coupled to the primary shaft 42 arises particularly.

In light of the above, in the power transmission device 20 of the embodiment, as shown in FIG. 2, a hole portion 31a is formed in the pump body 31 structuring the oil pump 30 so that the hole portion 31a is positioned at an upper portion when installing the power transmission device 20 on the vehicle. The pump cover 32 is formed with a lubricating flow passage 32a extending from the outer circumference side toward the center. The pump cover 32 is arranged in the case 21 so that an outer circumference side end portion of the lubricating flow passage 32a is positioned on the front side of the vehicle, and a center side end portion of the lubricating flow passage 32a is positioned on the rear side of the vehicle when installing the power transmission device 20 on the vehicle. The lubricating flow passage 32a downwardly inclines toward the rear side of the vehicle. The lubricating flow passage 32a communicates with: the hole portion 31a serving as an inlet of the working fluid through a groove formed on a surface on the pump cover 32 side of the pump body 31; and portions neighboring the gear, the brake B1, and the clutch C1 of the forward/backward switching unit 35 through, for example, a groove and a hole formed in a stator sleeve 26 supporting the one-way clutch CO and the like, and a gap formed between the stator sleeve 26 and the input shaft 41. Thus, when a vehicle installed with the power transmission device 20 is towed, the working fluid is pushed up from the inner bottom portion of the case 21 (converter housing 21a and transaxle case 21b in the embodiment) by the differential ring gear 65 positioned on the lowermost side of the case 21 among the gears included in the gear mechanism 60 and is guided to the hole portion 31a of the pump body 31 by the gear mechanism 60. Consequently, due to the action of gravity, the working fluid as a lubricating medium can be supplied to lubrication objects such as the gear, the brake B1, the clutch C1, and the like of the forward/backward switching unit 35 through the hole portion 31a, the lubricating flow passage 32a of the pump cover 32, and the like.

Since the power transmission device 20 of the embodiment has a mirror-inverted arrangement of a general power transmission device for a front-wheel-drive vehicle, when the vehicle moves forward by the normal rotation of the differential shafts 70a and 70b, the differential ring gear 65 on the lowermost side pushes up the working fluid stored at the inner bottom portion of the case 21 toward the center of the inner part of the case without making the working fluid flow along an inner wall surface of the transaxle case 21b, as shown in the dashed two-dotted line in FIG. 2. Thus, without any countermeasures, the working fluid pushed up by the differential ring gear 65 on the lowermost side is never carried by the gear mechanism 60, and flows into the oil pan 80 attached to the case 21 so that the oil pan 80 is located closer to the rear of the vehicle than the differential ring gear 65 and below the CVT 40. Consequently, when the vehicle is towed, the working fluid as the lubricating medium may not be sufficiently supplied to the forward/backward switching unit 35 which is a lubrication object, or the working fluid at the inner bottom portion of the case 21 to be pushed up by the differential ring gear 65 may run short. Thus, the transaxle case 21b is formed with a partition wall 21w upwardly extending from the inner bottom portion of the case and surrounding a part of the outer circumference of the differential ring gear 65 on the center side of the inner part of the case. As shown in FIG. 2, the partition wall 21w is formed to surround at least the lower half of the outer circumference of the differential ring gear 65 on the center side of the inner part of the case, that is, to surround at least one forth of the outer circumference on the lower side of the rear side (left side of FIG. 2) of the vehicle. In the embodiment, as shown in FIG. 2, an upper end portion of the partition wall 21w is positioned to guide the working fluid to the meshing portion of the drive pinion gear 64 as an intermediate gear between the differential ring gear 65 and the counter drive gear 61, and the differential ring gear 65. Also, in the embodiment, to store a sufficient amount of the working fluid at the inner bottom portion of the case around the differential ring gear 65, the width of the partition wall 21w is made equal to the width of the inner part of the case 21 (about the same length as the length of the counter shaft 62). Thus, the partition wall 21w defines an accommodating portion of the differential ring gear 65 and the differential mechanism 66 together with inner wall surfaces of the converter housing 21a and the transaxle case 21b. The accommodating portion of the differential ring gear 65, and the like communicate with an inner part of the oil pan 80 through a communicating passage, including a hole 21h formed in a side wall portion 21aw of the converter housing 21a opposite to a side surface on the engine side of the differential ring gear 65 and extending parallel to the differential shafts 70a and 70b, that is, a flow passage extending along the axial direction of the differential ring gear 65.

By forming the partition wall 21w in the inner parts of the converter housing 21a and the transaxle case 21b, the working fluid pushed up by the differential ring gear 65 can be further favorably directed to the meshing portion of the differential ring gear 65 and the drive pinion gear 64 as an intermediate gear. In the power transmission device 20 of the embodiment, as shown in FIG. 2, the rotational direction of the differential ring gear 65 at the lowermost side and the counter drive gear 61 at the uppermost side coincides. Thus, the working fluid pushed up by the differential ring gear 65, carried to the meshing portion of the drive pinion gear 64 and the differential ring gear 65 by being guided by the partition wall 21w, and carried to the upper portion by the drive pinion gear 64 is guided to a meshing portion of the counter driven gear 63 as an intermediate gear and the counter drive gear 61 by the rotation of the counter drive gear 61. Consequently, the working fluid may drop into the oil pan 80 without being guided further upwardly. Thus, the transaxle case 21b is provided with a guide wall 21g that surrounds a part of the outer circumference of the counter drive gear 61 on the uppermost side, and that guides the working fluid pushed up by the differential ring gear 65 and carried by the drive pinion gear 64 and the differential ring gear 65 to the hole portion 31a (inlet of the lubricating flow passage 32a) of the pump body 31. As shown in FIG. 2, the guide wall 21g extends from an inner surface of the side wall portion of the transaxle case 21b to surround almost the upper half of the outer circumference of the counter drive gear 61 on the uppermost side, and defines a flow passage 21p having an arc shape and leading to the hole portion 31a together with the inner wall surface of the transaxle case 21b on the upper side. Also, an end portion of the guide wall 21g on the hole portion 31a side extends substantially horizontally to appropriately accumulate the working fluid from the flow passage 21p and to make the working fluid adequately flow into the hole portion 31a. The end portion of the guide wall 21g opposite to the hole portion 31a side is positioned to receive the working fluid carried by the differential ring gear 65 and the drive pinion gear 64, and to prevent the working fluid from dropping on the meshing portion of the counter drive gear 61 and the counter driven gear 63. Thus, in the power transmission device 20 of the embodiment, as shown in the dotted line of FIG. 2, the working fluid pushed up by the differential ring gear 65 is guided to the meshing portion of the drive pinion gear 64 and the differential ring gear 65 by the partition wall 21w. The working fluid carried upward by the drive pinion gear 64 is guided to the flow passage 21p defined by the guide wall 21g and the inner wall surface of the transaxle case 21b on the upper side. The working fluid flowing into the flow passage 21p is favorably guided into the hole portion 31a that is the inlet of the lubricating flow passage 32a by the action of gravity without being affected by the rotation of the counter drive gear 61. In the embodiment, although the guide wall 21g is structured of a continuous member, the present invention is not limited thereto, and may be divided into a plurality of portions including a portion surrounding the counter drive gear 61, a portion forming an oil accumulator, and the like.

In the power transmission device 20 of the embodiment, the guide wall 21g is provided in the case 21 in view of lubrication of the forward/backward switching unit 35 when the vehicle is towed. Another principal purpose of providing the guide wall 21b is to guide the working fluid to the flow passage 21p. Thus, an amount of working fluid guided to the meshing portion of the counter driven gear 63 and the counter drive gear 61 is adversely reduced, and the working fluid to be accumulated near the bearings 93 and 94 that support the counter shaft 62 may become insufficient. If the working fluid supplied to the bearings 93 and 94 becomes insufficient as described above, for example, in a case where a drive wheel (differential ring gear 65) rotates at extremely high speed while the ambient environmental temperature is extremely low, the temperature of the bearings 93 and 94, and the counter shaft 62 supported by the bearings 93 and 94 may become excessively high.

In view of the problems described above, the power transmission device 20 of the embodiment is structured to, while not changing the total amount of working fluid used for lubrication of the entire device, supply the working fluid lubricating, for example, the bearings 90 and 91 of the secondary shaft 44 that is the shaft of the counter drive gear 61 positioned at the uppermost side of the case 21 among the gears included in the gear mechanism 60 when installing the power transmission device 20 on the vehicle to the bearings 93 and 94 of the counter shaft 62 that is the shaft of the drive pinion gear 64 and the counter driven gear 63 that meshes with and is located below the counter drive gear 61 by the action of gravity.

Figure 3:
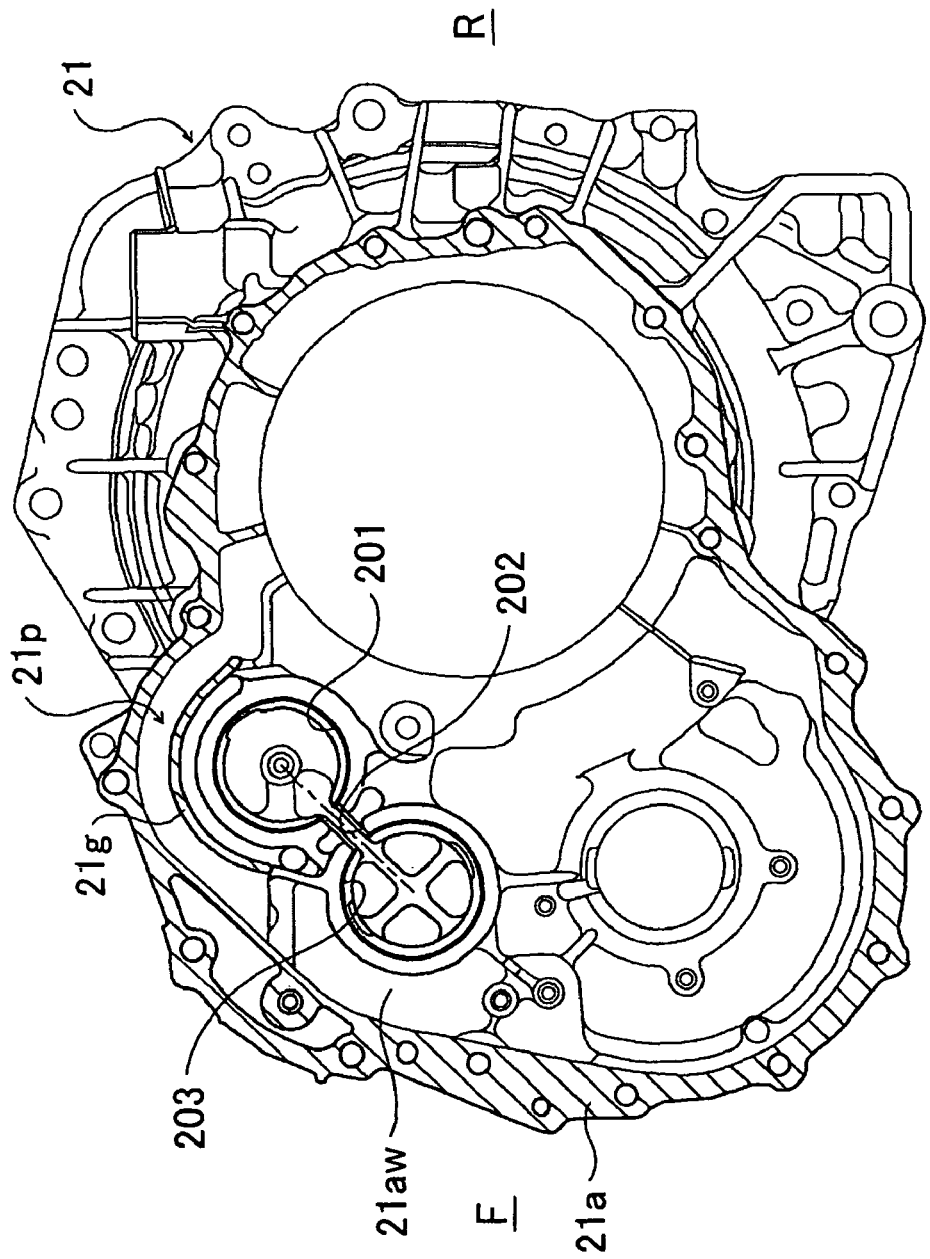
FIG. 3 is a partial cross-sectional view of an inner part of a converter housing 21a of the power transmission device 20 of the embodiment.
Figure 4:
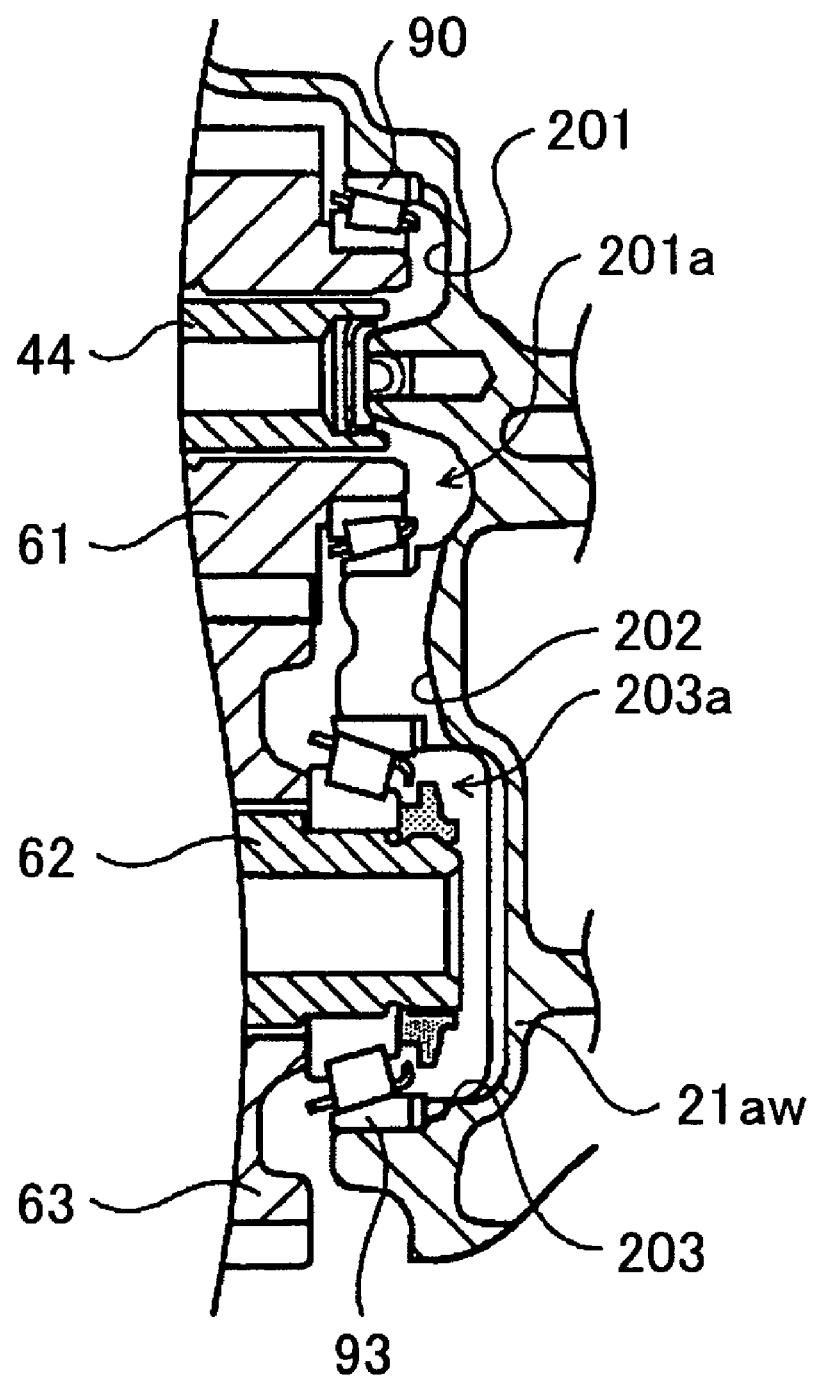
FIG. 4 is a partial enlarged cross-sectional view of a main part of the converter housing 21a of the power transmission device 20 of the embodiment.

That is, as shown in FIG. 3 and FIG. 4, the bearing 90 that supports one end (right end in FIG. 1) of the secondary shaft 44 that is the shaft of the counter drive gear 61 is fitted and fixed to an uppermost side bearing attaching portion 201 that is a recessed portion formed in an inner surface of the side wall portion 21aw of the converter housing 21a. By the bearing 90 being fixed to the uppermost side bearing attaching portion 201 in such a way, an uppermost side working fluid storage portion 201a is defined between the bearing 90 and the uppermost side bearing attaching portion 201. The uppermost side working fluid storage portion 201a communicates with a hole formed in the secondary shaft 44, gaps in a spline fitting portion of the secondary shaft 44 and the counter drive gear 61, and the like. The uppermost side working fluid storage portion 201a is also capable of storing a certain amount of working fluid by receiving a supply of the working fluid from the oil pump 30 (see FIG. 1) through an oil passage not shown. Thus, by supplying the working fluid as a lubricating medium to the uppermost side working fluid storage portion 201a, the working fluid from the oil pump 30 is guided from the uppermost side working fluid storage portion 201a to the bearing 90, the bearing 91 that communicates with the hole of the secondary shaft 44, the spline fitting portion of the secondary shaft 44 and the counter drive gear 61, and the like. Thus, these elements can be forcibly lubricated. Also, the bearing 93 that supports one end of the counter shaft 62 (right end in FIG. 1) that is the shaft of the counter driven gear 63 and the drive pinion gear 64 is fitted and fixed to a lower side bearing attaching portion 203 that is a recessed portion formed in the inner surface of the side wall portion 21aw of the converter housing 21a, as shown in FIG. 3 and FIG. 4. By the bearing 93 being fixed to the lower side bearing attaching portion 203 in such a way, a lower side working fluid storage portion 203a is defined between the bearing 93 and the lower side bearing attaching portion 203. The lower side working fluid storage portion 203a communicates with the hole formed in the counter shaft 62, gaps in a spline fitting portion of the counter shaft 62, and the counter drive gear 63 and the drive pinion gear 64, and the like. The lower side working fluid storage portion 203a is also capable of storing a certain amount of working fluid.

The uppermost side working fluid storage portion 201a and the lower side working fluid storage portion 203a are communicated with each other through a communicating passage 202 that is a recessed portion formed in the inner surface of the side wall portion 21aw of the converter housing 21a. In the embodiment, the communicating passage 202 extends along a straight line connecting the shaft center of the secondary shaft 44 and the shaft center of the counter shaft 62 in a shortest distance, as shown in the dashed-dotted line in FIG. 3. Also, as shown in FIG. 4, the depth of the communicating passage 202 is formed to gradually decrease from the uppermost side bearing attaching portion 201 towards a center portion of the communicating passage 202, and gradually increase from the center portion toward the lower side bearing attaching portion 203. That is, the inner surface of the communicating passage 202 is formed so that the center portion of the communicating passage 202 in its extending direction gradually rises (see FIG. 4). Consequently, a part of the working fluid as a lubricating medium supplied to the uppermost side working fluid storage portion 201a by the oil pump 30 flows down by the action of gravity to the lower side working fluid storage portion 203a through the communicating passage 202. The working fluid flowing into the lower side working fluid storage portion 203a is guided to the bearing 93, the bearing 94 that communicates with the hole of the counter shaft 62, and the spline fitting portion of the counter shaft 62, and the counter driven gear 63 and drive pinion gear 64, and the like. Thus, this enables the lubrication of these elements (natural lubrication).

As described above, in the power transmission device 20 of the embodiment, the secondary shaft 44 that is the shaft of the counter drive gear 61 positioned at the uppermost side of the case 21 when installing the power transmission device 20 on the vehicle among the gears included in the gear mechanism 60 as a transmission mechanism accommodated in the case 21 is rotatably supported by the bearings 90 and 91 as the uppermost side bearings fixed to the case 21. The counter shaft 62 that is the shaft of the counter driven gear 63 and the drive pinion gear 64 located on the lower side of the counter drive gear 61 when installing the power transmission device 20 on the vehicle among the gears included in the gear mechanism 60 is rotatably supported by the bearings 93 and 94 as the lower side bearings fixed to the case 21. Also, the uppermost side working fluid storage portion 201a is defined between the bearing 90 and the side wall portion 21aw of the converter housing 21a (case 21) so that working fluid as a lubricating medium is guided to the bearing 90, and the like. The lower side working fluid storage portion 203a positioned below the uppermost side working fluid storage portion 201a when installing the power transmission device 20 on the vehicle is defined between the bearing 93 and the side wall portion 21aw of the converter housing 21a (case 21) so that the lower side working fluid storage portion 203a guides the lubricating medium to the bearing 93, and the like. The uppermost side working fluid storage portion 201a and the lower side working fluid storage portion 203a are communicated with each other through the communicating passage 202 formed in the converter housing 21a. Thus, when the working fluid as a lubricating medium is supplied to the uppermost side working fluid storage portion 201a, the working fluid is guided from the uppermost side working fluid storage portion 201a to the bearings 90 and 91, flows down to the lower side working fluid storage portion 203a through the communicating passage 202, and is guided from the lower side working fluid storage portion 203a to the bearings 93 and 94. Thus, in the power transmission device 20 of the embodiment, if the working fluid is supplied to the uppermost side working fluid storage portion 201a, the bearings 93 and 94 as lubrication objects can be favorably lubricated even if the working fluid as a lubricating medium is not forcibly supplied to the bearings 93 and 94.

In the power transmission device 20 of the embodiment, the working fluid is forcibly supplied from the oil pump 30 to the uppermost side working fluid storage portion 201a. Thus, the working fluid can be stably supplied to the uppermost side working fluid storage portion 201a, and also a sufficient amount of working fluid can be supplied from the uppermost side working fluid storage portion 201a to the lower side working fluid storage portion 203a, whereby the bearings 93 and 94 can be further favorably lubricated. Further, the communicating passage 202 of the embodiment extends along the straight line connecting the shaft center of the secondary shaft 44 that is the shaft of the counter drive gear 61 and the shaft center of the counter shaft 62 that is the shaft of the counter driven gear 63 and the drive pinion gear 64. Thus, the shapes of the periphery of an opening portion in the communicating passage 202 with respect to the uppermost side working fluid storage portion 201a and the periphery of an opening portion in the communicating passage 202 with respect to the lower side working fluid storage portion 203a do not to include portions extremely acute, and the like, and stress concentration can be prevented from being generated. Consequently, durability of the case 21 (converter housing 21a) can be improved. Also, in the embodiment, the uppermost side working fluid storage portion 201a is defined between the bearing 90 and the side wall portion 21aw of the converter housing 21a, and the lower side working fluid storage portion 203a is defined between the bearing 93 and the side wall portion 21aw of the converter housing 21a. The communicating passage 202 is formed as a recessed portion formed in the side wall portion 21aw of the converter housing 21a in a manner that the depth of the communicating passage 202 gradually decreases from the uppermost side working fluid storage portion 201a toward a center portion of the communicating passage 202, and gradually increases from the center portion toward the lower side working fluid storage portion 203a. Thus, even if the communicating passage 202 having a recessed shape is formed in the side wall portion 21aw of the converter housing 21a, rigidity of the side wall portion 21aw can be secured without preventing the flow of the working fluid from the uppermost side working fluid storage portion 201a to the lower side working fluid storage portion 203a.

Further, the power transmission device 20 of the embodiment includes the differential ring gear 65 that is positioned at the lowermost side of the case 21 among the gears included in the gear mechanism 60 when installing the power transmission device 20 on the vehicle, and that pushes up the working fluid at the inner bottom portion of the case 21 toward the center of the inner part of the case without making the working fluid flow along the inner wall surface of the case 21 when the differential shafts 70a and 70b as the front wheel axles rotate normally. The device 20 has a mirror-inverted arrangement of a general power transmission device for a front-wheel-drive vehicle. Consequently, in a vehicle installed with the power transmission device 20, the primary shaft 42 of the CVT 40 is positioned closer to the rear of the vehicle than the differential ring gear 65 or the differential mechanism 66 when installing the power transmission device 20 on the vehicle. Thus, the wheelbase can be easily extended. Also, the differential ring gear 65 at the lowermost side pushes up the working fluid at the inner bottom portion of the case 21 toward the center of the inner part of the case without making the working fluid flow along the inner wall surface of the case 21 when the differential shafts 70a and 70b rotate normally, and the counter drive gear 61 at the uppermost side rotates in the same direction as the differential ring gear 65 when the differential shafts 70a and 70b rotate normally. With such a structure, a sufficient amount of working fluid (lubricating medium) may not be carried from the differential ring gear 65 to the counter driven gear 63 and the drive pinion gear 64 as the intermediate gears. However, by communicating the uppermost side working fluid storage portion 201a and the lower side working fluid storage portion 203a through the communicating passage 202 as described above, a sufficient amount of working fluid can be carried to the counter driven gear 63 and the drive pinion gear 64. Thus, in the vehicle installed with the power transmission device 20, the wheelbase can be easily extended, and a lubrication object that is not forcibly supplied with the working fluid as a lubricating medium can be favorably lubricated.

Although the best mode for carrying out the present invention has been described above using the embodiment, the present invention is not limited to the embodiment described above, and various alternations may be made without departing from the scope of the present invention.

The present invention is applicable in a manufacturing industry and the like of a power transmission device for a vehicle.

What is claimed is:

1. A power transmission device for a vehicle that includes a transmission mechanism accommodated in a case and transmitting power between a plurality of rotating elements, and that transmits power from a power generation source to an axle through the transmission mechanism with the power transmission device installed on the vehicle, the power transmission device comprising:

an uppermost side bearing that is fixed to the case and rotatably supports a shaft of a counter drive gear positioned on the uppermost side of the case among the rotating elements included in the transmission mechanism when installing the power transmission device on the vehicle;

a lower side bearing that is fixed to the case and rotatably supports a shaft of a drive pinion gear and counter driven gear meshing with the counter drive gear positioned on a lower side of the counter drive gear among the rotating elements included in the transmission mechanism when installing the power transmission device on the vehicle;

an uppermost side lubricating medium storage portion defined between the uppermost side bearing and the case to guide a lubricating medium to the uppermost side bearing;

a lower side lubricating medium storage portion defined between the lower side bearing and the case to guide the lubricating medium to the lower side bearing, and located below the uppermost side lubricating medium storage portion when installing the power transmission device on the vehicle;

a communicating passage formed in the case to communicate the uppermost side lubricating medium storage portion and the lower side lubricating medium storage portion with each other; and a guide portion that surrounds an upper part of an outer circumference of the counter drive gear, forms a flow path to an empty space between the counter drive gear and an inner wall surface of the case, guides the lubricating medium that is pushed up by the drive pinion gear to an inlet of a lubricating flow passage of a forward/backward switching mechanism, which is a lubricating object, and prevents the lubricating medium from dropping on a meshing portion of the counter drive gear and the counter driven gear, wherein:

the transmission mechanism is a gear train including at least three gears, the counter drive gear is an uppermost side gear positioned on the uppermost side of the case among the gears included in the gear train when the power transmission device is installed on the vehicle, the drive pinion gear and the counter driven gear are an intermediate gear positioned between the uppermost side gear and a lowermost side gear positioned on the lowermost side of the case among the gears included in the gear train when the power transmission device is installed on the vehicle, the lowermost side gear is a gear that pushes up the lubricating medium at an inner bottom portion of the case toward the center of an inner part of the case without making the lubricating medium flow along the inner wall surface of the case when the vehicle axis rotates normally, and the uppermost side gear is a gear that rotates in the same direction as the lowermost side gear when the vehicle axis rotates normally.

2. The power transmission device for a vehicle according to claim 1, further comprising a lubricating medium supplying unit that forcibly supplies the lubricating medium to the uppermost side lubricating medium storage portion.

3. The power transmission device for a vehicle according to claim 1, wherein the communicating passage extends along a line coupling the shaft of the counter drive gear and the shaft of the drive pinion gear and the counter driven gear.

4. The power transmission device for a vehicle according to claim 1, wherein the uppermost side lubricating medium storage portion is defined by the uppermost side bearing and a side wall portion of the case, the lower side lubricating medium storage portion is defined by the lower side bearing and the side wall portion of the case, and the communicating passage is a recessed portion formed in the side wall portion of the case in a manner that a depth of the recessed portion formed in the side wall portion of the case gradually decreases from the uppermost side lubricating medium storage portion toward a center portion of the communicating passage, and gradually increases from the center portion toward the lower side lubricating medium storage portion.

5. The power transmission device for a vehicle according to claim 1, further comprising:

a continuously variable transmission unit accommodated in the case and continuously shifting power from the power generation source and transmitting the power to the gear train; wherein the lowermost side gear is a differential ring gear coupled to a differential mechanism, and a primary shaft of the continuously variable transmission unit is positioned closer to the rear of the vehicle than the lowermost side gear when installing the power transmission device on the vehicle.

* * * * *